United States Patent
Ghosh et al.

(10) Patent No.: US 11,468,235 B2
(45) Date of Patent: Oct. 11, 2022

(54) RECOMMENDER AND REMEDIATION SYSTEM FOR ENTERPRISE SERVICE MANAGEMENT

(71) Applicant: BayesTree Intelligence Pvt Ltd., Santa Clara, CA (US)

(72) Inventors: Partha Pratim Ghosh, Bangalore (IN); Girish Koppar, Bangalore (IN); Avijit Biswas, Bangalore (IN); Jatin Puri, Bangalore (IN); Nabarun Mondal, Bangalore (IN)

(73) Assignee: BayesTree Intelligence Pvt Ltd., Santa Clara, CA (US)

( * ) Notice: Subject to any disclaimer, the term of this patent is extended or adjusted under 35 U.S.C. 154(b) by 0 days.

(21) Appl. No.: 16/634,656

(22) PCT Filed: Jan. 20, 2020

(86) PCT No.: PCT/IB2020/050424
§ 371 (c)(1),
(2) Date: Jan. 28, 2020

(87) PCT Pub. No.: WO2020/152572
PCT Pub. Date: Jul. 30, 2020

(65) Prior Publication Data
US 2021/0342536 A1 Nov. 4, 2021

Related U.S. Application Data

(60) Provisional application No. 62/814,008, filed on Mar. 5, 2019.

(30) Foreign Application Priority Data
Jan. 21, 2019 (IN) .............................. 201941002436

(51) Int. Cl.
| | |
|---|---|
| G06F 40/279 | (2020.01) |
| G06F 16/31 | (2019.01) |
| G06F 16/35 | (2019.01) |
| G06F 40/205 | (2020.01) |
| G06F 40/169 | (2020.01) |
| G06N 5/02 | (2006.01) |
| H04L 41/5074 | (2022.01) |

(52) U.S. Cl.
CPC .......... *G06F 40/279* (2020.01); *G06F 16/313* (2019.01); *G06F 16/319* (2019.01); *G06F 16/35* (2019.01); *G06F 40/169* (2020.01); *G06F 40/205* (2020.01); *G06N 5/022* (2013.01); *H04L 41/5074* (2013.01)

(58) Field of Classification Search
CPC .... G06F 40/279; G06F 16/313; G06F 16/319; G06F 16/35; G06F 40/169; G06F 40/205; G06N 5/022; H04L 41/5074
USPC ............................................................. 704/9
See application file for complete search history.

(56) References Cited

U.S. PATENT DOCUMENTS

| | | |
|---|---|---|
| 5,107,499 A | 4/1992 | Lirov et al. |
| 5,678,002 A | 10/1997 | Fawcett et al. |
| 6,327,363 B1 | 12/2001 | Henderson et al. |
| 6,542,601 B1 | 4/2003 | Hernandez et al. |
| 6,542,898 B1 | 4/2003 | Sullivan et al. |
| 7,305,465 B2 | 12/2007 | Wing et al. |
| 8,161,325 B2 | 4/2012 | Calman et al. |
| 8,200,661 B1 | 6/2012 | Pearce et al. |
| 2008/0091454 A1 | 4/2008 | Fisher, Jr. |
| 2011/0055699 A1* | 3/2011 | Li .................... G06F 16/951 715/709 |
| 2012/0030163 A1 | 2/2012 | Zhong et al. |
| 2014/0149411 A1* | 5/2014 | Anand .................. G06F 16/35 707/737 |
| 2017/0178000 A1 | 6/2017 | Manske et al. |
| 2018/0077088 A1 | 3/2018 | Cabrera-Cordon et al. |

FOREIGN PATENT DOCUMENTS

| | | |
|---|---|---|
| WO | 2014089024 A3 | 6/2014 |

* cited by examiner

*Primary Examiner* — Thierry L Pham
(74) *Attorney, Agent, or Firm* — MG Miller Intellectual Property Law LLC

(57) ABSTRACT

A system and method for automatically and algorithmically resolving service tickets through the utilization of historical solution data obtained from multiple sources. The system and method are optionally capable of providing and executing a BOT capable of implementing one or solutions based on the automatic and algorithmic recommendation of a solution to resolve the service ticket(s).

10 Claims, No Drawings

RECOMMENDER AND REMEDIATION SYSTEM FOR ENTERPRISE SERVICE MANAGEMENT

NOTICE OF COPYRIGHTS AND TRADE DRESS

A portion of the disclosure of this patent document contains material which is subject to copyright or trade dress protection. This patent document may show and/or describe matter that is or may become trade dress of the owner. The copyright and trade dress owner has no objection to the facsimile reproduction by anyone of the patent disclosure, as it appears in the Patent and Trademark Office patent files or records, but otherwise reserves all copyright and trade dress rights whatsoever.

CLAIM OF PRIORITY

This application claims priority to U.S. Provisional Patent Application No. 62/814,008 entitled "RECOMMENDER AND REMIDIATION SYSTEM FOR ENTERPRISE SYSTEM MANAGEMENT" filed on Mar. 5, 2019 and Indian Patent Application No.: 201941002436, entitled "RECOMMENDER AND REMIDIATION SYSTEM FOR ENTERPRISE SERVICE MANAGEMENT", filed on Jan. 21, 2019.

FIELD OF THE EMBODIMENTS

The present disclosure relates generally to the resolution of service tickets. In particular, the present disclosure and the embodiments contained therein relate to a system and method for automatically resolving service tickets through the utilization of historical solution data obtained from multiple sources.

BACKGROUND

According to the Pew Research Center, 90% of typical American households contain multiple connected devices. Correctly operating multiple devices for numerous things can come with a price tag not originally anticipated from the rapid advancements in technology. Now more than ever, humans rely on their technology for work, entertainment, or communication. With the speed at which these devices change and evolve, the typical end-users may find it harder to keep up with the problems, glitches, set-up, and maintenance associated with multiple devices. More succinctly, as our technological advancements create more complex problems, the user will require more complex solutions.

Anyone who has ever spent an entire afternoon on hold waiting for an I.T. specialist to help solve a technical issue can attest to the frustration associated with such an experience. Even more frustrating is the notion that a user may wait all this time only to find out that the solution was an easy, quick-fix or that the I.T. specialist was either hard to understand or unqualified to help the user reach a solution. In either scenario, companies have yet to fully embrace a modern solution to a modern problem. By relying on an A.I. system that provides solutions quickly, accurately, and with the option of implementing changes for the user, a user would likely find this as a more preferred choice when solving their tech issues.

Most companies also still rely on service tickets, phone calls, or in-app guidance type platforms to assist end-users in their technical struggles. One of the main issues facing companies and their I.T. departments is the speed at which employees can service a user's technical request through these types of platforms. As call-wait times have become outdated and unnecessary, companies need to be able to service the needs of the user in real time. Thus, an A.I. system that can handle large volumes of service tickets and resolve a wide range of issues with seemingly little effort and more importantly, in little to no time will greatly improve the relationships between companies and their users.

A remedy that many companies have implemented when faced with this challenge has been to simply punt. Rather than perform this I.T. service in-house, they will pay a third-party to help with the tech needs of their user base. It is not uncommon that these types of I.T. related call-jobs are shipped overseas, as it can help lessen the costs for companies. Additionally, building and operating such a department within their own facilities may not be the best option for some of the smaller companies on tighter budgets. Further, some industries simply lack the knowledge regarding the scope of some of these problems and may need a more experienced professional to help out. For companies that want to stay modern, adapting the way in which they help their customers solve issues related to their services or products may help stabilize user-company relationships in a quick and less-expensive way.

While at no fault of the I.T. specialists handling the requests, as our technological capabilities grow and evolve, the less likely it becomes that humans will be relied on to solve our ever-changing highly-complex problems. Currently, there is a hard cap on what the human brain is capable of. Humans can only store so much information and can only operate so quickly. With the immediacy in which our tech devices operate, users will need to lean more on A.I. services for prompt and accurate solutions.

Thus, there is a demand for a system that can reduce the speed it takes for end-users to find and fix their problems, lower the costs for companies who often have to hire third-party I.T. services, and provide accurate options that an end-user can implement with a click of a button.

SUMMARY

An aspect of an example embodiment in the present disclosure is to provide a method for automatically and algorithmically providing a solution to a problem ticket to an end-user to be executed by a connected processor and a connected memory. In some embodiments a second connected processor and one or more additional memories are employed. Preferably this method, begins by providing at least one problem ticket, where the problem ticket has multiple fields that each contain a portion of text. These fields may be a title, description, and resolutions. Alternatively, these fields may contain other types of categorized information relevant to the recommendations being made by the system and method. In many embodiments these problem tickets are input directly into the system performing the method, however, in other embodiments the system could employ an API or similar technology to provide the problem ticket or tickets.

The method then proceeds to normalize each portion of text for easier indexing/searching. Preferably, this is done by a processor performing one or more of the following steps: (1) processing the portion of text with a language parser; (2) replacing each word in the portion of text with all-lowercase versions of each word; (3) removing stop words from the portion of text; and/or (4) reducing each word on the portion of text to its word stem. Once the text has been normalized, a number of inverted indices or "problem inverted indices" are generated for each of the detected fields in each of the problem tickets and are stored in a memory. In many embodiments, these problem inverted indices are weighted to allow the system and method to make more relevant recommendations, where one or more of the detected fields have a higher relevance than other detected fields.

The method then requires that a database, or other type of computer memory, containing a plurality of index solution tickets is provided. Preferably, this database is incorporated into the system in accordance with the present disclosure. This database should have a number of indexes of tickets that provide a known solution to a problem, each ticket being called a solution ticket and each index being called an index solution ticket. Each of these solution tickets should have at least one field where the at least one field correlates at least in part to the multiple fields of the problem ticket. The method then proceeds to the step of performing a similarity calculation, by the processor, to determine the most-similar solution ticket to the problem ticket. While cosine similarity is a preferred similarity calculation, other similarity metrics are contemplated by the present disclosure such as normalized and non-normalized okapi BM25 distance functions. Based on the similarity calculation or calculations in the previous step, the method then automatically recommends to the end-user the solution ticket with the highest similarity metric to that of the problem ticket.

The system and method in accordance with the present disclosure can prepare inverted indices where the inversion is based on tfidf, tf, idf, or length-of-document. When performing the similarity calculation by the processor, some embodiments exist where the plurality of problem inverted indices are given a static weight assignment, and other embodiments exist where the problem inverted indices are each given a dynamic weight assignment.

Various similarity calculations are contemplated by the present disclosure. In a preferred method, this similarity calculation begins with a procesor extending the dimensions of the problem ticket and subsequently categorizing each of the plurality of problem inverted indices where inverted indices relating to the same field are grouped together. From there, a similarity measure between each of the problem inverted indices is weighted by the processor, against each of the indexed solution tickets stored in the solution database. When the similarity measure yields a value above a predetermined amount, the index solution ticket is then joined with any other index solution tickets with similarity measures above the predetermined amount. Dimension extension is then performed, by the processor, on the joined tickets and then a second similarity measure comparing each field of the problem ticket with each grouped field of the joined tickets is calculated. The system and method then utilize the processor to provide the top 'x' results sampled from the top (x*a) results of the joined tickets, where 'a' is an integer multiple of 'x.'

In various embodiments, the database of solution tickets can be populated from a number of different sources. Such sources include standard operating procedures, knowledge base articles, and FAQ sections of related websites. In order for these knowledge sources to be ingested, manual human input is required whereby a human user annotates the information with at least one piece of relevant metadata. This will allow both the system and method to more readily use this information when performing the similarity calculation to determine the most-similar solution ticket(s) with the problem ticket.

In other embodiments, the system and method in accordance with the present disclosure are capable of recommending a BOT configured to implement as a solution in lieu of, or in addition to, the provided solution ticket(s). This can be achieved by having a human user manually annotating the BOT with at least one item of metadata which corresponds to at least one of the fields in the problem ticket. In these embodiments, the system and method are also capable of delivering and executing the BOT, preferably on a second processor, to and on the end-user's device to implement the determined solution to the problem ticket.

The present disclosure addresses at least one of the foregoing disadvantages. However, it is contemplated that the present disclosure may prove useful in addressing other problems and deficiencies in a number of technical areas. Therefore, the claims should not necessarily be construed as limited to addressing any of the particular problems or deficiencies discussed hereinabove. To the accomplishment of the above, this disclosure may be embodied in the form illustrated in the accompanying drawings. Attention is called to the fact, however, that the drawings are illustrative only. Variations are contemplated as being part of the disclosure.

Implementations may include one or a combination of any two or more of the aforementioned features.

These and other aspects, features, implementations, and advantages can be expressed as methods, apparatuses, systems, components, program products, business methods, and means or steps for performing functions, or some combination thereof.

Other features, aspects, implementations, and advantages will become apparent from the descriptions, the drawings, and the claims.

DETAILED DESCRIPTION OF THE PREFERRED EMBODIMENTS

The present disclosure provides for a system that is capable of recommending solutions to service management tickets by algorithmically matching solutions contained in a linked database to the service management ticket. The present disclosure also provides for a method of algorithmically matching solutions contained in a linked database to the service management ticket.

While many embodiments of the system exist, a highly preferred embodiment will now be described. This preferred embodiment of the system has a resolver containing a first user interface configured for use by end-users and a recommendation engine. Further, this embodiment of the system also features a monitoring hub containing a second interface configured for service management personnel, as well as a service management interface layer configured to import and normalize information provided from the end-users into the system, a transport layer for moving information between various parts of the system, and a system health layer which is configured to monitor the overall health of the system and to detect outages.

The first user interface allows an end-user to submit their service requests into the system. Preferably, this will be done in the form of a service ticket. While this service ticket may contain just a single field of text, it preferably contains at least three fields: a title field; a description field; and a resolution field. Other embodiments exist where the service request ticket contains information as to the owner, subsystem, date of creation, date of closure, ticket type, historical information, and the like. The system is also capable of combining the information in the service ticket with other associated information about the end-user. This is achieved through a data adaptation layer parsing this other associated information into the recommendation engine. The service ticket is also sent to the recommendation engine through one or more machine-learning oriented REST APIs. The recommendation engine performs a large majority of the method in accordance with the present disclosure, as described below.

Once the recommendation engine has made a recommendation as to the most-similar solution ticket present, the system will provide that solution ticket to the end-user. In embodiments where a BOT is identified as the most-similar solution ticket, the BOT will be delivered to the end-user as an executable file.

The monitoring hub of the system in accordance with the present invention enables the system to be scaled to process multiple problem tickets from multiple sources simultaneously. The monitoring hub is capable of monitoring various stats of the system, such as CPU utilization, memory utilization, the amount of open ports, number of events being processed, number of alters, and disk utilization. These stats are then utilized by the system health layer to determine the health of the system, predict when the system is about to fail, and in some embodiments, diagnose the cause of the potential failure.

The method in accordance with the present disclosure provides for the ability to automatically and algorithmically provide solutions to service management tickets. In a highly preferred embodiment, the method begins by assembling one or more issues in the form of service tickets. Preferably, these tickets are provided in JavaScript Object Notation format, but the present disclosure also provides for these tickets to be in html, csv, tsv, excel, database tables, and similar formats. These tickets are assembled by the data adaptation layer of the system and are pushed into an aggregator for aggregation. The aggregated tickets are then sent to the transport layer such that the aggregated tickets may be normalized and indexed for use by the recommendation engine. As mentioned above, the service tickets preferably have multiple dimensions, and those dimensions likely have varying importance for use in determining the most relevant solution to the ticket. This normalization and indexing is done on a per-dimension basis.

In many embodiments, normalization consists of processing the portion of text with a language parser, replacing each word in the portion of text with all-lowercase versions of each word, removing stop words from the portion of text, and reducing each word on the portion of text to its word stem. In other embodiments, normalization may also utilize word vectors, paragraph vectors, tfidf vectors, hot-encoded vectors. Note that because the system utilizes abstracted vectors, there are virtually no limits as to what normalization techniques may be employed. Once each dimension or field has been normalized a vector is generated for the field which is subsequently inverted. This inversion may utilize tf-idf, tf, idf, length-of-document, or word vectors. In other embodiments, this inversion utilizes word vectors, paragraph vectors, tfidf vectors, and hot-encoded vectors. Note that because the system utilizes abstracted vectors, there are virtually no limits as to what inversion techniques may be employed.

The method performs the above normalization, indexing, and inversion for both the actual ticket or tickets, as well as on a test set of a related issue. These results are then merged into a database which is used by the recommendation engine. The recommendation engine performs a similarity calculation between each field of the problem ticket(s) and fields of one or more solution tickets. In some embodiments these fields are given equal weight, while in other embodiments these fields are given unequal weights, where the fields with higher weights are more relevant to the similarity calculation. Preferably, the dynamic weighting of each field will differ based on the type of problem ticket. In one embodiment, this type of dynamic weighting is achieved by assigning weights to specifics present in a certain type of ticket. In another embodiment, this type of dynamic weighting can be achieved by correlating the weights to user click-throughs. That is, how users interact with solutions tickets provided to them would be logged, and through the use of a support vector machine, the system could begin to make determinations as to how to weight various fields based on the type of problem ticket submitted. Preferably, this is done with an eye towards minimizing the normalized discounted cumulative gain.

One embodiment of this similarity calculation consists of, for each field present in the problem ticket(s) first initiating the top 'K' matches of the solution tickets. For example, the "title" field of the problem ticket, would be compared against the title of each solution ticket, and the top 'K' matches would be provided, where 'K' is a user-configurable variable. The top matches are preferably determined through calculating the pair's cosine similarity, but other methodologies such as Okapi BM25, normalized taxicab geometry, and Minkowski distances can be used. After the top 'K' matches are determined or each field, a list of the matches is compiled. This list may contain the actual tickets themselves or merely some sort of reference ID of each ticket. From there, the dimensions of each of the tickets in the list is joined into a big space having a number of subspaces based on the fields present in the listed tickets. These subspaces may be weighted equally or may be weighted dynamically. Preferably the method will utilize machine learning to dynamically assign the weights of the fields for certain types of queries and problems. The weighting of these fields can be used to address tickets with incomplete information (i.e., tickets with blank fields). Note that the accuracy of this matching determination can be improved if the top (K*a) matches are provided, where 'a' is an integer multiple of 'K.'

The present disclosure also discloses methodologies for assembling solution tickets from a wide variety of sources. This has the benefit of allowing the invention in accordance with the present disclosure to continually develop its database of solution tickets, even as new technologies, new problems, and new solutions to those problems arise. The system is capable of ingesting knowledge from a variety of sources such as standard operating procedures, knowledges base articles, FAQ sections from related websites, and forums. For each of these sources, a new namespace is defined to allow the system to efficiently crawl through ingested information and to maintain the independence of these sources. This information is transformed into solution tickets by having a human user manually annotate the knowledge with fields such as "title" and "description" to match the pseudo-standardized format of the submitted problem tickets.

Another aspect of the present invention in accordance with the present disclosure is to provide for the automatic recommendation of BOTs capable of fixing a problem described in a problem ticket. These BOTs can also be viewed as solution tickets by the system when a human user manually annotates the BOTs with metadata such as "title" and "description" to match the pseudo-standardized format of the submitted problem tickets. These BOTs may be provided in lieu of or as a supplement to the closest knowledge-based solution ticket. Preferably the BOTs are an executable file configured to solve one or more pre-identified problems.

It is understood that when an element is referred hereinabove as being "on" another element, it can be directly on the other element or intervening elements may be present therebetween. In contrast, when an element is referred to as being "directly on" another element, there are no intervening elements present.

Moreover, any components or materials can be formed from a same, structurally continuous piece or separately fabricated and connected.

It is further understood that, although ordinal terms, such as, "first," "second," "third," are used herein to describe various elements, components, regions, layers and/or sections, these elements, components, regions, layers and/or sections should not be limited by these terms. These terms are only used to distinguish one element, component, region, layer and/or section from another element, component, region, layer and/or section. Thus, "a first element," "component," "region," "layer" and/or "section" discussed below could be termed a second element, component, region, layer and/or section without departing from the teachings herein.

Features illustrated or described as part of one embodiment can be used with another embodiment and such variations come within the scope of the appended claims and their equivalents.

Spatially relative terms, such as "beneath," "below," "lower," "above," "upper" and the like, are used herein for ease of description to describe one element or feature's relationship to another element(s) or feature(s) as illustrated in the FIGURES. It is understood that the spatially relative terms are intended to encompass different orientations of the device in use or operation in addition to the orientation depicted in the FIGURES. For example, if the device in the FIGURES is turned over, elements described as "below" or "beneath" other elements or features would then be oriented "above" the other elements or features. Thus, the example term "below" can encompass both an orientation of above and below. The device can be otherwise oriented (rotated 90 degrees or at other orientations) and the spatially relative descriptors used herein interpreted accordingly.

Example embodiments are described herein with reference to cross section illustrations that are schematic illustrations of idealized embodiments. As such, variations from the shapes of the illustrations, for example, of manufacturing techniques and/or tolerances, are to be expected. Thus, example embodiments described herein should not be construed as limited to the particular shapes of regions as illustrated herein, but are to include deviations in shapes that result, for example, from manufacturing. For example, a region illustrated or described as flat may, typically, have rough and/or nonlinear features. Moreover, sharp angles that are illustrated may be rounded. Thus, the regions illustrated in the figures are schematic in nature and their shapes are not intended to illustrate the precise shape of a region and are not intended to limit the scope of the present claims.

The invention is described above with reference to block and flow diagrams of systems, methods, apparatuses, and/or computer program products according to exemplary embodiments of the invention. It will be understood that one or more blocks of the block diagrams and flow diagrams, and combinations of blocks in the block diagrams and flow diagrams, respectively, can be implemented by computer-executable program instructions. Likewise, some blocks of the block diagrams and flow diagrams may not necessarily need to be performed in the order presented, or may not necessarily need to be performed at all, according to some embodiments of the invention.

These computer-executable program instructions may be loaded onto a general-purpose computer, a special-purpose computer, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable memory that can direct a computer or other programmable data processing apparatus to function in a particular manner, such that the instructions stored in the computer-readable memory produce an article of manufacture including instruction means that implement one or more functions specified in the flow diagram block or blocks. As an example, embodiments of the invention may provide for a computer program product, comprising a computer-usable medium having a computer-readable program code or program instructions embodied therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, can be implemented by special-purpose, hardware-based computer systems that perform the specified functions, elements or steps, or combinations of special purpose hardware and computer instructions.

As the invention has been described in connection with what is presently considered to be the most practical and various embodiments, it is to be understood that the invention is not to be limited to the disclosed embodiments, but on the contrary, is intended to cover various modifications and equivalent arrangements included within the scope of the appended claims. Although specific terms are employed herein, they are used in a generic and descriptive sense only and not for purposes of limitation.

This written description uses examples to disclose the invention, including the best mode, and also to enable any person skilled in the art to practice the invention, including making and using any devices or systems and performing any incorporated methods. The patentable scope of the invention is defined in the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

In conclusion, herein is presented a system and method for automatically and algorithmically resolving service management problem tickets. The disclosure is illustrated by example in the drawing FIGURES, and throughout the written description. It should be understood that numerous variations are possible, while adhering to the inventive concept. Such variations are contemplated as being a part of the present disclosure.

What is claimed is:

1. A computer-implemented method for automatically providing a solution to a problem ticket to an end-user, comprising the steps of:
    providing a problem ticket in an electronic format,
        wherein the problem ticket has multiple fields that each contain a portion of text;
    normalizing, by a processor, each portion of text to create a modified version of each portion of text which is stored in a memory;
    generating, by the processor, a problem inverted index for each of the multiple fields of the problem ticket, based on the modified version of each portion of text created in the previous step;
    weighting, by the processor, each of the problem inverted indices to assist in the automatic recommendation;
    providing a database containing a plurality of index solution tickets, each index solution ticket having at least one field, each field having a corresponding solution inverted index, where the at least one field correlates at least in part to at least one field of the problem ticket and one or more proposed solutions;
    performing a similarity calculation on the plurality of index solution tickets, by the processor, to determine a most-similar index solution ticket to the problem ticket;
    determining, by the processor, the most-similar index solution ticket in the database; and
    automatically providing the most-similar index solution ticket and the corresponding one or more proposed solutions to the end-user.

2. The method of claim 1, wherein each of the multiple fields are selected from the group consisting essentially of: title, description, and resolution.

3. The method of claim 1, the step of "normalizing, by a processor, each portion of text to create a modified version of each portion of text which is stored in a memory" further comprises:
    processing, by the processor, each portion of text with a language parser and storing each processed portion in the memory;
    subsequently replacing, by the processor each word in the processed portion from the above step with all-lower-case versions of each word and storing the replacement in the memory;
    removing, by the processor, stop words from each portion of text from the above step; and
    reducing, by the processor, each word on each portion of text from the above step to each word's word stem.

4. The method of claim 1, wherein each of the problem inverted indices is based on a method selected from the group consisting of: tfidf; tf; idf, and length-of-document.

5. The method of claim 1, wherein each of the problem inverted indices are is given a static weight assignment by the processor.

6. The method of claim 1, wherein each of the problem inverted indices arc is given a dynamic weight assignment by the processor.

7. The method of claim 3, wherein the similarity calculation comprises:
    assigning, by the processor, a different category to each of the problem inverted indices, and assigning each of the plurality of solution inverted indices to a category assigned to a problem inverted index, where problem inverted indices and solution inverted indices relating to the same field are assigned to the same category;
    calculating, by the processor, a plurality of first similarity measures by calculating a similarity measure of the problem inverted index in one category of the assigned categories against each of the solution inverted indices in the same category and repeating for each other category;
    joining, by the processor, for each category, the top (x*a) results from the plurality of index solution tickets based on the plurality of first similarity measures, where a is an integer multiple of x, to create a set of joined index solution tickets;
    extending, by the processor, the multiple fields of the problem ticket
    extending, by the processor, the at least one field of each of the joined index solution tickets;
    calculating, by the processor, a second similarity measure of the extended problem ticket against each of the joined index solution tickets;
    providing, by the processor, the top x results from the extended joined index solution tickets based on the second similarity measure.

8. The method of claim 7, wherein the database containing the plurality of index solution tickets is populated from a plurality of documents selected from the group consisting of: standard operating procedures, knowledge base articles, and FAQ sections of related websites,
    wherein each of the plurality of documents is manually annotated, by a human user, with at least one piece of relevant metadata to aid in the step of "performing a similarity calculation on the plurality of index solution tickets, by the processor, to determine a most-similar index solution ticket to the problem ticket".

9. The method of claim 8, further comprising the steps of:
    providing at least one BOT containing a linked, executable electronic file, configured to implement the one or more proposed solutions contained in the automatically provided index solution ticket;
    manually annotating, by a human user, each of the at least one BOTs with a portion of the at least one piece of relevant metadata corresponding to the at least one of the multiple fields in the problem ticket;
    populating the database with the annotated BOTs, such that each annotated BOT is listed as one of the plurality of index solution ticket within said database.

10. The method of claim 9, further comprising the step of:
    executing, by a second processor, one of the at least one annotated BOTs when it is identified as the most-similar solution ticket such that said BOT implements the one or more proposed solutions.

* * * * *